(12) United States Patent
Shoaib et al.

(10) Patent No.: US 9,916,540 B2
(45) Date of Patent: Mar. 13, 2018

(54) SCALABLE-EFFORT CLASSIFIERS FOR ENERGY-EFFICIENT MACHINE LEARNING

(71) Applicant: Microsoft Technology Licensing, LLC, Redmond, WA (US)

(72) Inventors: Mohammed Shoaib, Redmond, WA (US); Jie Liu, Medina, WA (US); Swagath Venkataramani, West Lafayette, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 512 days.

(21) Appl. No.: 14/603,222

(22) Filed: Jan. 22, 2015

(65) Prior Publication Data
US 2016/0217390 A1    Jul. 28, 2016

(51) Int. Cl.
*G06N 99/00*    (2010.01)
(52) U.S. Cl.
CPC .................. *G06N 99/005* (2013.01)
(58) Field of Classification Search
None
See application file for complete search history.

(56) References Cited

U.S. PATENT DOCUMENTS

| 7,724,784 | B2 * | 5/2010 | Perng | H04L 65/601 370/532 |
|---|---|---|---|---|
| 8,036,996 | B2 | 10/2011 | Long et al. | |
| 8,407,164 | B2 | 3/2013 | Malik et al. | |
| 2006/0149821 | A1 * | 7/2006 | Rajan | H04L 51/12 709/206 |
| 2011/0002531 | A1 | 1/2011 | Heisele et al. | |
| 2012/0054184 | A1 | 3/2012 | Masud et al. | |
| 2014/0079297 | A1 | 3/2014 | Tadayon et al. | |
| 2014/0229164 | A1 | 8/2014 | Martens et al. | |

OTHER PUBLICATIONS

Todorovski et al., Combining Classifiers with Meta Decision Trees, 2003, Machine Learning, 50, pp. 223-249.*
Xu et al., Classifier Cascades and Trees for Minimizing Feature Evaluation Cost, 2014, Journal of Machine Learning Research, 15, pp. 2113-2144.*

(Continued)

*Primary Examiner* — Alan Chen
(74) *Attorney, Agent, or Firm* — Drinker Biddle & Reath LLP (57) ABSTRACT

Scalable-effort machine learning may automatically and dynamically adjust the amount of computational effort applied to input data based on the complexity of the input data. This is in contrast to fixed-effort machine learning, which uses a one-size-fits-all approach to applying a single classifier algorithm to both simple data and complex data. Scalable-effort machine learning involves, among other things, classifiers that may be arranged as a series of multiple classifier stages having increasing complexity (and accuracy). A first classifier stage may involve relatively simple machine learning models able to classify data that is relatively simple. Subsequent classifier stages have increasingly complex machine learning models and are able to classify more complex data. Scalable-effort machine learning includes algorithms that can differentiate among data based on complexity of the data.

20 Claims, 7 Drawing Sheets

(56) References Cited

OTHER PUBLICATIONS

Pujara et al., Using Classifier Cascades for Scalable E-Mail Classification, 2011, ACM, 9 pages.*

Baltzakis et al., "A New Signature Verification Technique Based on a Two-Stage Neural Network Classifier", in the Journal of the Engineering Appications of Artificial Intelligence, vol. 14, Iss. 1, Feb. 2001, pp. 95-103.

Fan et al., "Incorporating Concept Ontology for Hierarchical Video Classification, Annotation, and Visualization", in the Proceedings of the IEEE Transaction on Multimedia, vol. 9, Iss. 5, Aug. 2007, pp. 939-957.

Hess, Andreas, "Supervised and Unsupervised Ensemble Learning for the Semantic Web", a dissertation submitted to the National University of Ireland, Dublin, Feb. 2006, 148 pages.

Ho et al., "Decision Combination in Multiple Classifier Systems", in the Journal of the IEEE Transaction on Pattern Analysis and Machine Intelligence, vol. 16, No. 1, Jan. 1994, pp. 66-75.

Joshi et al., "Scalable Active Learning for Multi-Class Image Classification", in the Journal of IEEE Transacation on Pattern Analysis and Machine Intelligence, vol. 34, Iss. 11, Jan. 2012, 16 pages.

Leinhart et al., "A Detector Tree of Boosted Classifiers for Real-Time Object Detection and Tracking", in the Proceedings of the 2003 International Conference on Multimedia and Expo, Jul. 6, 2003, 4 pages.

Mosley, Lawrence "A balanced approach to the multi-class imbalance problem", retrieved on Nov. 17, 2014 at <<http://http://lib.dr.iastate.edu/cgi/viewcontent.cgi?article=4544&context=etd>>, 142 pages.

Razavi et al., "Scalable Mutli-class Object Detection", in the Proceedings of the 2011 IEEE Conference on Computer Vision and Pattern Recoginition, Jun. 20, 2011, pp. 1505-1512.

Sun et al., "A Multi-stage Classifier Based Algorithm of Pedestrian Detection in Night with a Near Infrared Camera in a Moving Car", in the Proceedings of the 2004 IEEE First Symposium on Mutli-Agent Security and Survivability, Dec. 18, 2004, 4 pages.

Viola et al., "Robust Real-time Object Detection", in the International Journal of Computer Vision, Feb. 2012, 30 pages.

Wang et al., "BoCaTFBS: a boosted cascade learner to refine the binding sites suggested by ChIP-chip experiements", in the journal of Genome Biology, vol. 7, Iss. 11, Nov. 1, 2006, 15 pages.

Yuan et al., "Recent Advances of Large-scale Linear Classification", in the Proceedings of the IEEE, vol. 100, Iss. 9, Sep. 2012, 25 pages.

Zehder, Philipp, "Efficient Multi-Class Object Detection", a dissertation submitted to ETH Zurich for the Degree of Doctor of Sciences, retrieved on Nov. 17, 2014, 243 pages.

Zhang et al., "Multiple-Instance Pruning for Learning Efficient Cascade Detectors", in the Proceedings of the Neural Information Processing Systems Foundation, Dec. 1, 2001, 1 page.

* cited by examiner

| | LC.0 | LC.1 | ... | LC.M | OUTPUT |
|---|---|---|---|---|---|
| Row 1 | ++ | - - | - - | - - | CLASS 0 |
| Row 2 | - - | - - | - - | ++ | CLASS M |
| Row 3 | - - | ++ | - - | NC | NC |
| Row 4 | ++ | ++ | - - | - - | NC |
| Row 5 | ... | ... | ... | ... | ... |
| Row 6 | - - | NC | - - | - - | CLASS M |

SCALABLE-EFFORT CLASSIFIERS FOR ENERGY-EFFICIENT MACHINE LEARNING

BACKGROUND

Data-driven or supervised machine-learning algorithms are emerging as important tools for information analysis in portable devices, the cloud, and other computing devices. Machine learning involves various algorithms that can automatically learn over time. The foundation of these algorithms is built on mathematics and statistics that can be employed to predict events, classify entities, diagnose problems, and model function approximations. Applications of these algorithms include semantic text analysis, web search, and speech and object recognition, just to name a few examples. Supervised machine-learning algorithms typically operate in two phases: training and testing. In the training phase, typical input examples are used to build decision models that characterize the data. In the testing phase, the learned model is applied to new data instances in order to infer different properties such as relevance and similarity.

SUMMARY

This disclosure describes, in part, techniques and architectures for a scalable-effort (SE) machine learning system, which can automatically and dynamically adjust the amount of effort applied to input data based on the complexity of the data. For example, an amount of effort generally corresponds to an amount of computing time, energy, or resources such as area (e.g., footprint) or volume of hardware. Thus, a one-size-fits-all approach to applying a single classifier algorithm to both simple and complex data is avoided. SE machine learning involves cascaded classifiers and biased classifiers. Cascaded classifiers may be arranged as a series of multiple classifier stages having increasing complexity (and accuracy). For example, a first classifier stage involves the simplest machine learning models and is able to classify input data that is relatively simple. Subsequent classifier stages have increasingly complex machine learning models and are able to classify more complex input data. This approach provides a number of benefits, including faster computations and energy savings, as compared to fixed-effort machine learning.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Complexity of input data provided to computational systems generally varies. For example, complexity of data may be measured by the amount of computing time or cost (e.g., effort) required for a computer to process the data. For example, for an 8-bit multiplier, computing the product of 2 and 1 should be easier for a computational system as compared to multiplying 23 and 114. Similarly, in another example, compressing an image that contains mostly blue sky should take less effort as compared to compressing an image that contains a busy street. Typical computational systems do not dynamically adapt to the level of complexity of input data. Therefore, for example, the same algorithm is applied to both the mostly-blue sky image and the busy street image. In such cases, the algorithm is typically configured to operate optimally on either high-complexity input data or average-complexity input data. For the former configuration, computing effort (e.g., cost) tends to be "wasted" on all but the most complex input data. For the latter configuration, computing effort may be wasted on input data having below-average complexity, while relatively high levels of computational errors or uncertainties may occur for input data having above-average complexity.

In various embodiments, techniques and architectures involve scalable-effort (SE) machine learning that, among other things, automatically and dynamically adjusts the amount of computational effort applied to input data based on the complexity of the input data. As used herein, effort refers to the amount of time or energy expended by a computing device, the amount of area required for implementing a computing function in hardware, and so on. This is in contrast to fixed-effort machine learning, which uses a one-size-fits-all approach to applying a single classifier algorithm to both simple data and complex data. SE machine learning involves, among other things, cascaded classifiers and biased classifiers. Cascaded classifiers may be arranged as a series of multiple classifier stages having increasing complexity (and accuracy). For example, a first classifier stage may involve relatively simple machine learning models able to classify data that is relatively simple. Subsequent classifier stages have increasingly complex machine learning models and are able to classify more complex data. The levels of complexity of the classifier stages may be proportional to computing cost, for example.

SE machine learning includes algorithms that can differentiate among data based on complexity of the data. In this fashion, SE machine learning may expend computational effort (e.g., computational time and energy) that is proportional to the difficulty of the data. This approach provides a number of benefits, including faster computations and energy savings, as compared to fixed-effort machine learning.

Generally, fixed-effort machine learning operates in a training phase, where typical data examples are used to build a relatively complex decision model that characterizes the data. In contrast, during the training phase SE machine learning uses subsets of data to build a number of relatively simple decision models. During test time, depending on the difficulty of input data, SE machine learning may apply one or more decision models to the input data.

A traditional approach that may be used by a fixed-effort machine learning is now described to illustrate benefits provided by SE machine learning. A binary support-vector machine (SVM) classifier, for example, may incorporate a specific learning algorithm to build a decision boundary (model) based, at least in part, on input training data, hereinafter called training instances. The decision boundary may be used to separate data into two categories or classes in a features space. At test time, subsequent to training, input data, hereinafter called test instances, may be assigned to one of the two classes depending, at least in part, on the location and distance of the test instances from the decision boundary in the feature space. The computational effort (in terms of energy and time) to process every test instance generally depends on the complexity of the decision boundary and the location and distance of the test instances from the decision boundary. For example, non-linear decision boundaries typically cost more than linear decision boundaries. In a general case, a decision boundary may be non-linear in order to account for all complexity levels of test instances. Unfortunately, this may lead to relatively high computational effort for both complex and non-complex test instances.

In contrast to fixed-effort machine learning, SE machine learning generates multiple decision models by selecting training instances having varying levels of complexity. Such selecting may be called model-partitioning, which may reduce computing costs since all data instances need not be processed by the same non-linear decision model.

The amount of computational time and energy that can be saved using model-partitioning generally depends on the application at hand. Fortunately, in many applications, test instances tend to be relatively non-complex. For example, while detecting movement using a security camera, most video frames contain only relatively static objects. In another example, more than about two-thirds of handwriting recognition data may be far (and thus relatively non-complex) from a decision boundary.

In some embodiments, the complexity of a test instance may be determined implicitly at runtime. For example, test instances may be processed in a sequence of decision models starting from the simplest model and proceeding to increasingly complex models. After the application of each model in the sequence, a confidence level of a resulting output class label (e.g., class probability) may be determined. If the confidence level is beyond a particular threshold value, the output class label produced by the current model is considered to be a final outcome. In this case, the test instance is not processed by any subsequent models in the sequence. Thus, relatively non-complex test instances are processed by only one or the initial few (least complex) model(s) in the sequence, while relatively complex test instances are processed by more (increasingly complex) models in the sequence. This approach provides a resource management technique for achieving scalability in computational effort at runtime.

Various embodiments are described further with reference to FIGS. 1-14.

The environment described below constitutes but one example and is not intended to limit the claims to any one particular operating environment. Other environments may be used without departing from the spirit and scope of the claimed subject matter.

Figure 1:
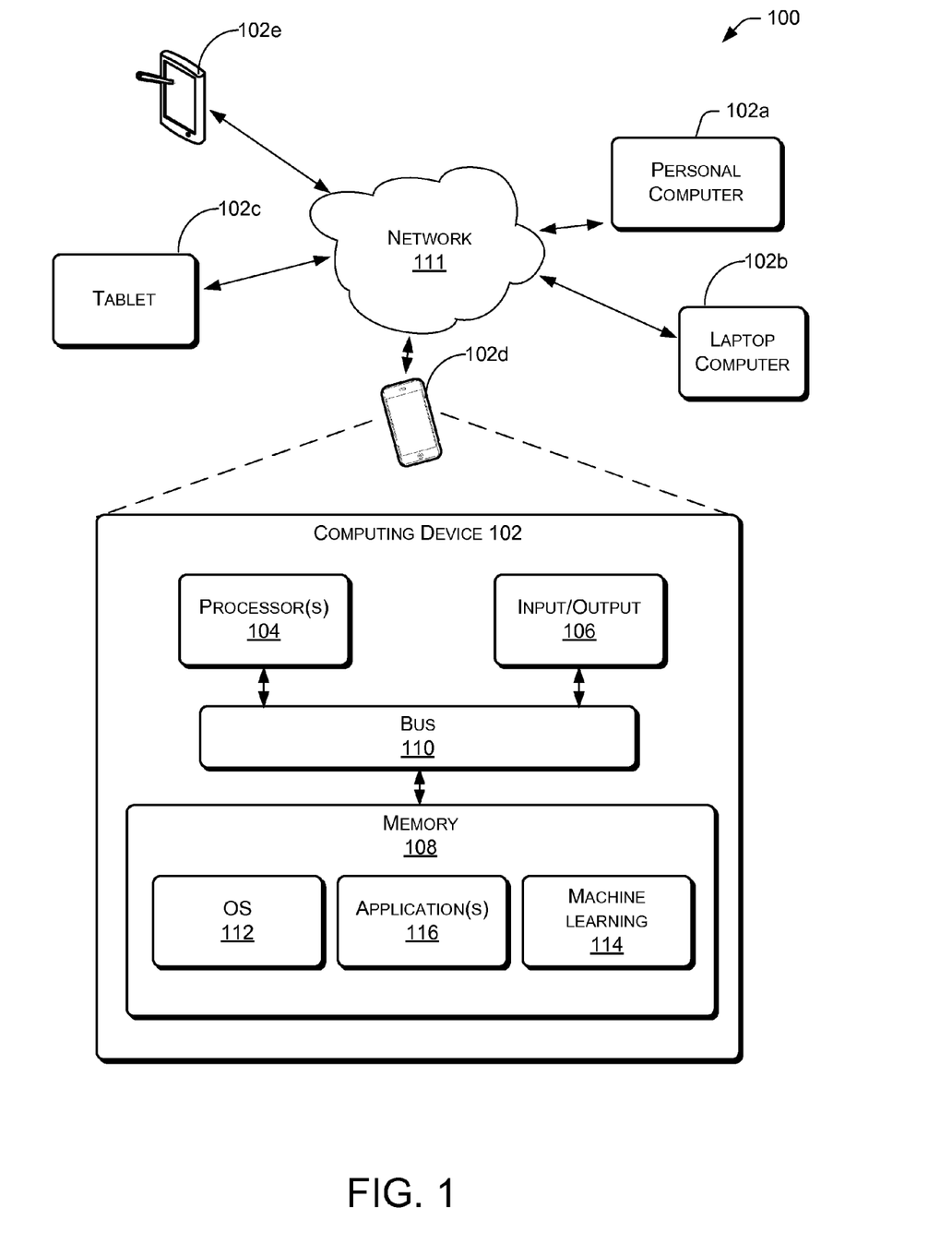
FIG. 1 is a block diagram depicting an example environment in which techniques described herein may be implemented.

FIG. 1 shows an example environment 100 in which embodiments involving SE machine learning as described herein can operate. In some embodiments, the various devices and/or components of environment 100 include a variety of computing devices 102. By way of example and not limitation, computing devices 102 may include devices 102a-102e. Although illustrated as a diverse variety of device types, computing devices 102 can be other device types and are not limited to the illustrated device types. Computing devices 102 can comprise any type of device with one or multiple processors 104 operably connected to an input/output interface 106 and memory 108, e.g., via a bus 110. Computing devices 102 can include personal computers such as, for example, desktop computers 102a, laptop computers 102b, tablet computers 102c, telecommunication devices 102d, personal digital assistants (PDAs) 102e, electronic book readers, wearable computers, automotive computers, gaming devices, etc. Computing devices 102 can also include business or retail oriented devices such as, for example, server computers, thin clients, terminals, and/or work stations. In some embodiments, computing devices 102 can include, for example, components for integration in a computing device, appliances, or other sorts of devices. In some embodiments, some or all of the functionality described as being performed by computing devices 102 may be implemented by one or more remote peer computing devices, a remote server or servers, or a cloud computing resource. In some embodiments, a computing device 102 may comprise an input port to receive an input value having a level of complexity and a memory device storing a plurality of machine learning models. The abilities of the machine learning models to classify the input value are different from one another. Computing device 102 may further comprise a processor to apply one or more of the plurality of the machine learning models based, at least in part, on the level of complexity of the input value.

In some embodiments, as shown regarding device 102d, memory 108 can store instructions executable by the processor(s) 104 including an operating system (OS) 112, a machine learning module 114, and programs or applications 116 that are loadable and executable by processor(s) 104. The one or more processors 104 may include one or more central processing units (CPUs), graphics processing units (GPUs), video buffer processors, and so on. In some implementations, machine learning module 114 comprises executable code stored in memory 108 and is executable by processor(s) 104 to collect information, locally or remotely by computing device 102, via input/output 106. The information may be associated with one or more of applications 116. Machine learning module 114 may selectively apply any of a number of machine learning decision models stored in memory 108 (or, more particularly, stored in machine learning 114) to apply to input data. The selecting may be based, at least in part, on the complexity of the input data.

Though certain modules have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, some or all of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In some embodiments, computing device 102 can be associated with a camera capable of capturing images and/or video and/or a microphone capable of capturing audio. For example, input/output module 106 can incorporate such a camera and/or microphone. Memory 108 may include one or a combination of computer readable media.

Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various embodiments, memory 108 is an example of computer storage media storing computer-executable instructions. When executed by processor(s) 104, the computer-executable instructions configure the processor(s) to, among other things, execute an application and collect information associated with the application. The information may be collected locally by computing device 102. When executed, the computer-executable instructions can also configure the processor(s) to normalize a feature output of a machine learning model accessible by the application based, at least in part, on the information collected locally by the client device.

In various embodiments, an input device of input/output (I/O) interfaces 106 can be a direct-touch input device (e.g., a touch screen), an indirect-touch device (e.g., a touch pad), an indirect input device (e.g., a mouse, keyboard, a camera or camera array, etc.), or another type of non-tactile device, such as an audio input device.

Computing device(s) 102 may also include one or more input/output (I/O) interfaces 106 to allow the computing device 102 to communicate with other devices. Input/output (I/O) interfaces 106 can include one or more network interfaces to enable communications between computing device 102 and other networked devices such as other device(s) 102. Input/output (I/O) interfaces 106 can allow a device 102 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 2:
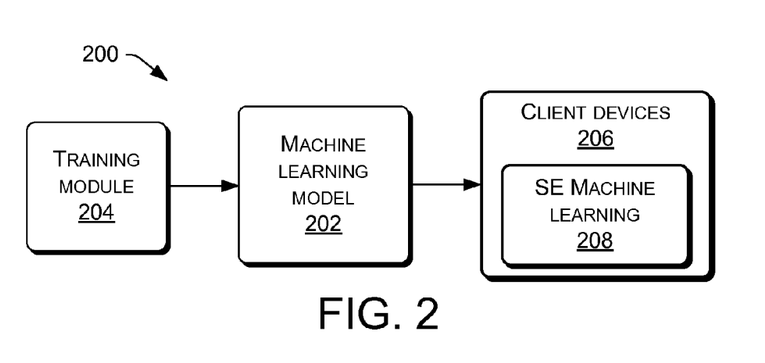
FIG. 2 is a block diagram of a machine learning system, according to various example embodiments.

FIG. 2 is a block diagram of a machine learning system 200, according to various example embodiments. Machine learning system 200 includes a machine learning model 202, a training module 204, and a number of client devices 206. Machine learning model 202 receives training data from offline training module 204. For example, training data can include data from a population, such as a population of users operating client devices or applications executed by a processor of client devices. Data can include information resulting from actions of users or can include information regarding the users themselves. Data from the population can be used to train machine learning model 202. Subsequent to such training, machine learning model 202 can be employed in client devices 206. Thus, for example, training using the data from the population of users for offline training can act as initial conditions for the machine learning model.

Machine learning model 202, in part as a result of offline training module 204, can be configured for a relatively large population of users. For example, machine learning model 202 can include a number of classification threshold values that are set based on average characteristics of the population of users of offline training module 204. Client devices 206 can modify machine learning model 202, however, subsequent to machine learning model 202 being loaded onto client devices 206. In this way, SE machine learning can occur on individual client devices 206. The modified machine learning model is designated as SE machine learning 208. In some implementations, for example, SE machine learning 208 comprises a portion of an operating system of client device 206.

Figure 3:
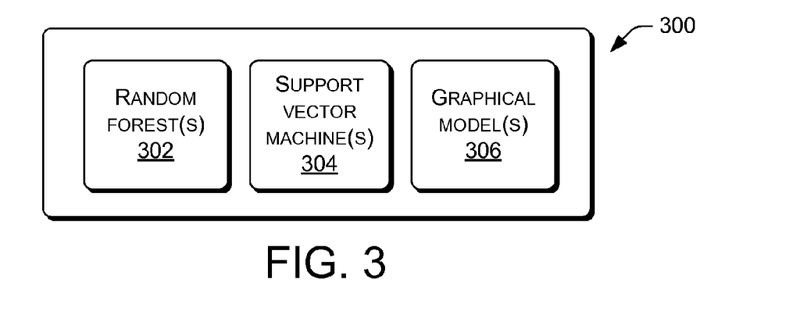
FIG. 3 is a block diagram of machine learning models, according to various example embodiments.

FIG. 3 is a block diagram of a machine learning model 300, according to various example embodiments. For example, machine learning model 300 may be the same as or similar to machine learning model 202 shown in FIG. 2. Machine learning model 300 includes any of a number of functional blocks, such as random forest block 302, support vector machine block 304, and graphical models block 306. Random forest block 302 can include an ensemble learning method for classification that operates by constructing decision trees at training time. Random forest block 302 can output the class that is the mode of the classes output by individual trees, for example. Random forest block 302 can function as a framework including several interchangeable parts that can be mixed and matched to create a large number of particular models. Constructing a machine learning model in such a framework involves determining directions of decisions used in each node, determining types of predictors to use in each leaf, determining splitting objectives to optimize in each node, determining methods for injecting randomness into the trees, and so on.

Support vector machine block 304 classifies data for machine learning model 300. Support vector machine block 304 can function as a supervised learning model with associated learning algorithms that analyze data and recognize patterns, used for classification and regression analysis. For example, given a set of training data, each marked as belonging to one of two categories, a support vector machine training algorithm builds a machine learning model that assigns new training data into one category or the other.

Graphical models block 306 functions as a probabilistic model for which a graph denotes conditional dependence structures between random variables. Graphical models provide algorithms for discovering and analyzing structure in distributions and extract unstructured information. Applications of graphical models include information extraction, speech recognition, computer vision, and decoding of low-density parity-check codes, just to name a few examples.

Figure 4:
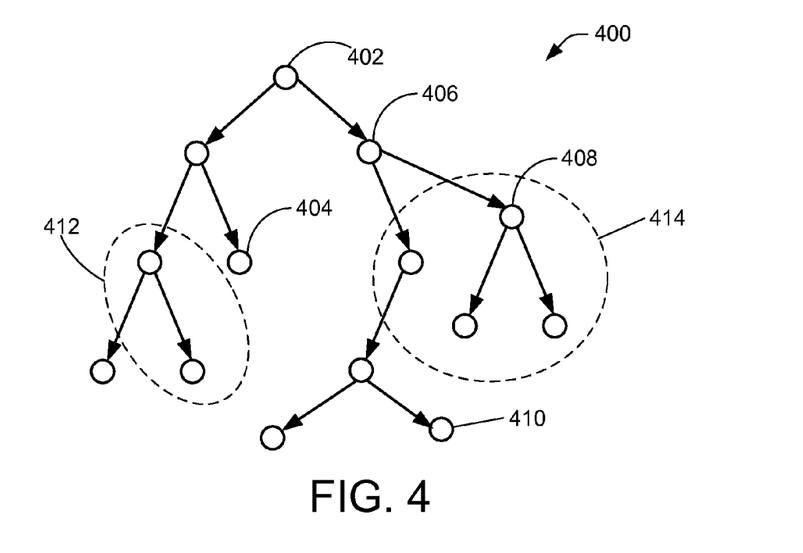
FIG. 4 shows a portion of a tree of support vectors for a machine learning model, according to various example embodiments.

FIG. 4 shows a tree 400 of support vectors and nodes for an SE machine learning model hosted by a client device (e.g., client devices 206), according to various example embodiments. For example, tree 400 includes decision nodes 402, 404, 406, 408, and 410 connected along particular paths by various support vectors (indicated by arrows). Tree 400 may represent merely a part of a larger tree including, for example, hundreds or thousands of nodes and support vectors.

In some implementations, methods performed by a client device include a strategy to reduce memory and CPU footprints. For example, such methods include selecting a subset of a machine learning model to load into memory, such as random access memory (RAM) or volatile memory of the client device. Such selecting may be based, at least in part, on test instances collected by the client device. The subset of the machine learning model comprises less than the entire machine learning model.

A machine learning model operates by following support vectors and nodes of tree 400. Though a machine learning model corresponds to a large tree, of which tree 400 may be a relatively small part, generally only a portion of the tree is used at any one time. For example, portion 412 of tree 400 may not be used by a client device of a particular user at a particular time. On the other hand, portion 414 of tree 400 may be used relatively often because of use patterns of the user. For example, if a machine learning model hosted by a client device includes a tree portion regarding voice commands and speech recognition, then that tree portion may rarely be used for a user of the client device who rarely utilizes voice commands and speech recognition on the client device. In such a case, in some embodiments, the rarely used tree portion need not be stored with the rest of the tree. For example, an entire machine learning model can be stored in read-only memory (ROM) while less than the entire machine learning model can be selectively stored in random access memory (RAM).

Moreover, subsets of tree 400 may be selected based, at least in part on complexity of test instances. For example, a subset of portion 414 may be used for test instances having relatively low complexity while the entire portion 414 may be used for test instances having relatively high complexity.

Figure 5:
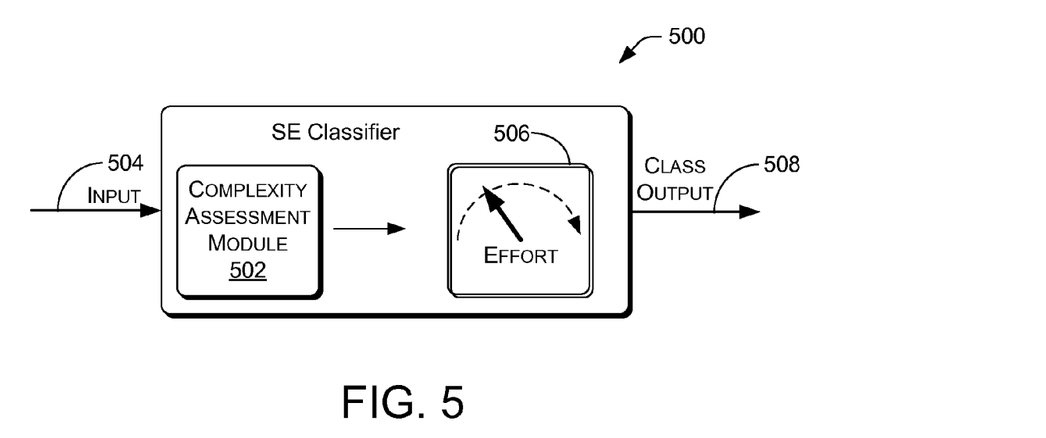
FIG. 5 is a schematic representation of a scalable-effort classifier of a machine learning model, according to various example embodiments.

FIG. 5 is a schematic representation of an SE classifier 500 of a machine learning model, according to various example embodiments. SE classifier 500 includes a complexity assessment (CA) module 502 that determines complexity of input data 504 received by the SE classifier. For example, as described in detail below, CA module 502 may determine complexity of data by applying various machine learning models to the data. Each of the machine learning models, respectively, is able to categorize data having less than particular levels of complexity. CA module 502 may calculate confidence levels of output class labels that result from applying each of the machine learning models to the data. Because such confidence levels correspond to particular machine learning models having differing abilities for categorizing data, complexity of the data may be determined based on the confidence levels of each of the particular machine learning models. For example, if the confidence level of an output class label resulting from the application of a particular machine learning model on data is beyond a threshold value, then CA module 502 may determine that the data has less than a particular complexity. On the other hand, if the confidence level of an output class label resulting from the application of a particular machine learning model on data is less than a threshold value, then CA module 502 may determine that the data has greater than a particular complexity. In the latter case, CA module 502 may apply one or more subsequent machine learning models (of increasing complexity) to the data until an output class label resulting from the application of a particular machine learning model is beyond a threshold value.

Block 506 represents an ability of SE classifier 500 to dynamically vary the amount of computing effort applied to classifying input data 504. As discussed above, the amount of computing effort may be varied based, at least in part, on the complexity of input data 504. For example, if input data 504 is relatively simple, SE classifier 500 may generate a class label output 508 with relatively little effort. Computing cost will be relatively low. On the other hand, if input data 504 is relatively complex, SE classifier 500 may generate a class label output 508 with relatively high effort to meet the challenge presented by the higher complexity data.

Figure 6:
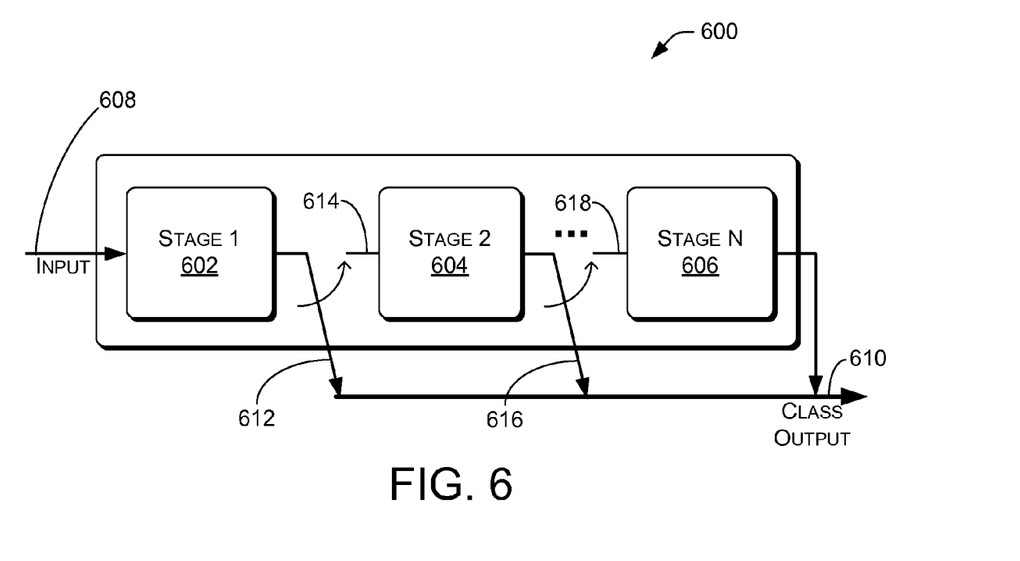
FIG. 6 is a block diagram of a scalable-effort classifier of a machine learning model, according to various example embodiments.

FIG. 6 is a block diagram of an SE classifier 600 of a machine learning model, according to various example embodiments. For example, SE classifier 600 may perform operations similar to or the same as those described for SE classifier 500. In some embodiments, SE classifier 600 comprises a number N of machine learning model stages of which several, 602-606, are illustrated. N may be any integer greater than two, for example. Each of the machine learning model stages 602-606 may be created during training processes, leading to SE classifier 600. For example, given a particular classification algorithm, different machine learning models are generated by learning using the particular classification algorithm and training data. These machine learning models are then arranged in a sequence of stages 602-606 so that the initial stages are computationally efficient but have lower classification accuracies, while the later stages have both higher complexities and higher accuracies. Moreover, each stage in the sequence may have the capability to implicitly assess the complexity of input data, as described above regarding CA module 502, for example. Subsequent to training, during test time, data may be processed at each of stages 602-606, starting at stage 602 having the simplest model, to produce a class label. Each of stages 602-606 may also produce a confidence value associated with the class label. The confidence value determines whether or not the input is passed on to a subsequent next stage. Thus, class labels may be produced earlier in the sequence of stages 602-606 for easy test instances and later in the sequence of stages for difficult test instances. If a test instance reaches the final stage of the sequence of stages 602-606, the output label generated by the final stage may be used regardless of the confidence value of the output label.

A first example that demonstrates operation of SE classifier 600 begins with test instance input 608 that is relatively simple (e.g., non-complex). SE classifier 600 applies machine learning model stage 1 to input 608, resulting in a class label and a confidence value for the class label. In this example, the confidence value is above a particular threshold value. This implies that the complexity (although relatively low) of machine learning model stage 1 was sufficient to produce a class label with high likelihood of being correct. The class label is provided to an output port 610 of SE classifier 600. None of subsequent machine learning stages 2, 3 . . . N are invoked and the process is finished. Determining a class label for relatively simple input data involved relatively simple computing effort.

A second example that demonstrates operation of SE classifier 600 begins with test instance input 608 that is more complex as compared to input 608 in the previous example. SE classifier 600 applies machine learning model stage 1 to input 608, resulting in a class label and a confidence value for the class label. In this example, the confidence value is below a particular threshold value. This implies that the complexity (being relatively low) of machine learning model stage 1 was insufficient to produce a class label with high likelihood of being correct. Accordingly, subsequent and more complex machine learning model stage 2 will be applied to input 608. This is indicated schematically in FIG. 6 where arrow 612 is directed away from output port 610 of SE classifier 600 to an input port 614 of machine learning model stage 2. SE classifier 600 applies machine learning model stage 2 to input 608, resulting in a class label and a confidence value for the class label. In this example, the confidence value is above a particular threshold value. This implies that the complexity of machine learning model stage 2 was sufficient to produce a class label with high likelihood of being correct. Accordingly, the class label is provided to output port 610 of SE classifier 600. None of subsequent machine learning stages 3 . . . N are invoked and the process is finished.

A third example that demonstrates operation of SE classifier 600 begins with test instance input 608 that is more complex as compared to input 608 in the previous example. SE classifier 600 applies machine learning model stage 1 to input 608, resulting in a class label and a confidence value for the class label. In this example, the confidence value is below a particular threshold value. This implies that the complexity (being relatively low) of machine learning model stage 1 was insufficient to produce a class label with high likelihood of being correct. Accordingly, subsequent and more complex machine learning model stage 2 will be applied to input 608. This is indicated schematically in FIG. 6 where arrow 612 is directed away from output port 610 of SE classifier 600 to an input port 614 of machine learning model stage 2. SE classifier 600 applies machine learning model stage 2 to input 608, resulting in a class label and a confidence value for the class label. In this example, the confidence value is below a particular threshold value. This implies that the complexity of machine learning model stage 2 was insufficient to produce a class label with high likelihood of being correct. Accordingly, SE classifier 600 sequentially applies subsequent and more complex machine learning models to input 608. Finally, if the confidence value of machine learning model stage (N−1) is below a particular threshold value, SE classifier 600 applies subsequent and more complex machine learning model stage N to input 608. This is indicated schematically in FIG. 6 where arrow 616 is directed away from output port 610 of SE classifier 600 to an input port 618 of machine learning model stage N. SE classifier 600 applies machine learning model stage N to input 608, resulting in a class label and a confidence value for the class label. Because machine learning model stage N is the final stage of the sequence, the class label is provided to output port 610 of SE classifier 600 regardless of the confidence value for the class label. Determining a class label for relatively complex input data involved relatively complex computing effort.

Figure 7:
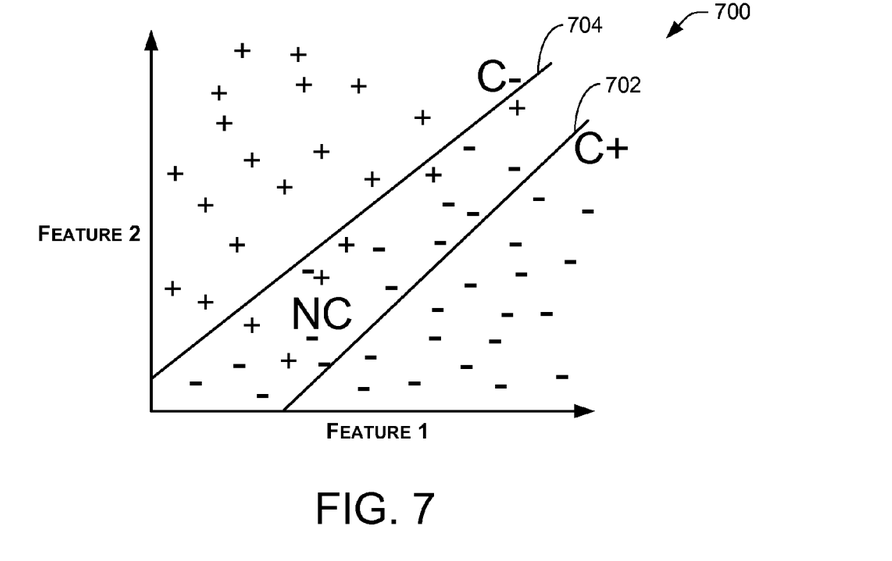
FIG. 7 shows a number of features plotted in a feature space, according to various example embodiments.

FIG. 7 shows a number of features plotted in a feature space 700, according to various example embodiments. Feature space 700 may have dimensions for a feature 1 and a feature 2, for example. Each "+" and "−" may represent a feature resulting from a feature extraction operation of a test instance. + and − may be two classes for a binary classification algorithm. Indicated in the figure, a classifier 702 is biased toward class "+" and denoted as "C+", whereas a classifier 704 is biased toward class "−" and denoted as "C−". In some embodiments, a machine learning classifier may label any feature in feature space 700 above classifier 702 as class "+" and any feature in feature space 700 below classifier 702 as class "−". On the other hand, the machine learning classifier may label any feature in feature space 700 above classifier 704 as class "+" and any feature in feature space 700 below classifier 704 as class "−".

Figure 8:
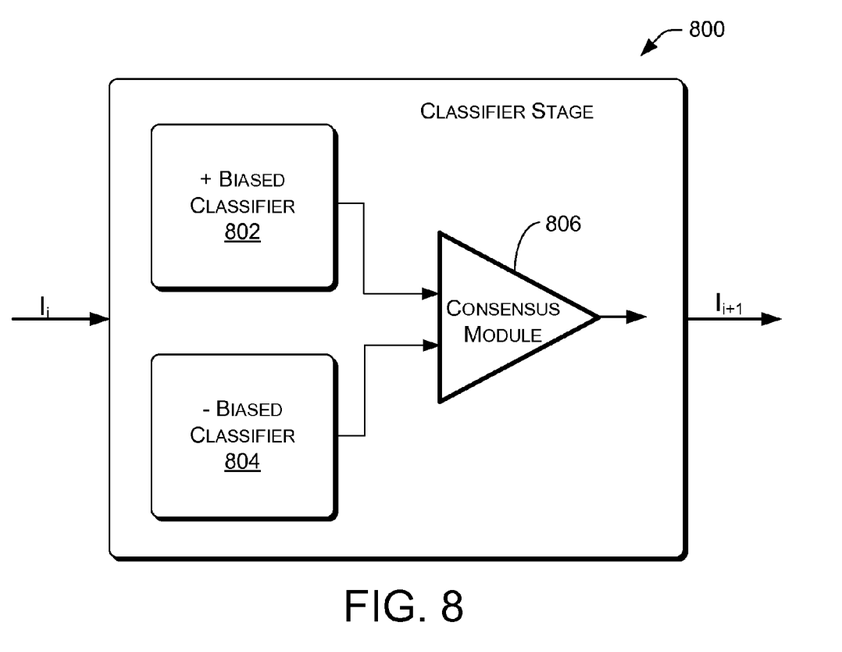
FIG. 8 is a block diagram of a scalable-effort classifier stage of a machine learning model, according to various example embodiments.

FIG. 8 is a block diagram of an SE classifier stage 800 of a machine learning model, according to various example embodiments. For example, SE classifier stage 800 may be the same as or similar to any of machine learning model stages 602-606, illustrated in FIG. 6. SE classifier stage 800 may be the ith stage of a machine learning model. For example, referring to FIG. 6, if SE classifier stage 800 is the ith stage (e.g., stage 1) of machine learning model 600, then stage 2 of machine learning model 600 is the (i+1)th stage. Test instance input $I_i$ for the ith stage may produce output $I_{i+1}$ for the (i+1)th stage, and so on.

SE classifier stage 800 may include two biased classifiers, which are biased for and against a particular class, and a consensus module, which determines the confidence level of a class label produced by the SE classifier stage. In particular, a + biased classifier 802 and a − biased classifier 804 may individually operate on test instance input $I_i$. For example, + biased classifier 802 may be the same as or similar to classifier 702 biased toward class "+" and denoted as "C+" in FIG. 7, whereas − biased classifier 804 may be the same as or similar to classifier 704 biased toward class "−" and denoted as "C−".

SE classifier stage 800 may, for example, be used for a binary classification algorithm with two possible class outcomes + and −. + biased classifier 802 and − biased classifier 804 may be trained to detect one particular class with high accuracy. For example, + biased classifier 802 is biased towards class + (denoted by C+). Thus, + biased classifier 802 may relatively frequently mispredict class labels for test instances from class −, but seldom mispredict class labels for test instances from class +. On the other hand, − biased classifier 804 is biased towards class − (denoted by C−). Thus, − biased classifier 804 may relatively frequently mispredict class labels for test instances from class +, but seldom mispredict class labels for test instances from class −.

Consensus module 806, which may comprise a comparator, is configured to determine the confidence value of the class label assigned to every test instance by + biased classifier 802 and − biased classifier 804. Consensus module 806 of the ith stage receives output from + biased classifier 802 and − biased classifier 804 to produce output that is either a class label or input to a subsequent classifier stage (i+1). Whether the output is a class label or input to a subsequent classifier stage may be based, at least in part, on two criteria. First, if the biased classifiers 802 and 804 predict the same class (e.g., ++ or −−), then consensus module 806 determines a consensus and the corresponding label (e.g., + or −) is produced as output. Second, if the biased classifiers 802 and 804 predict different classes (e.g., +− or −+), then consensus module 806 determines no consensus (NC). In this case input $I_i$ to classifier stage 800 is considered to be too difficult to be classified by classifier stage 800 and the next-stage input $I_{i+1}$ is produced and provided to the next-stage classifier (not illustrated in FIG. 8).

In an example embodiment, biased classifiers 802 and 804 may be represented as biased classifiers 702 and 704, respectively, plotted in feature space 700. In this case, and for at least the reason that classifier stage 800 may be relatively early in the sequence of classifier stages and thus relatively simple, the two biased classifiers (e.g., C+ and C−) are linear SVMs, which are computationally efficient. Referring to FIG. 7, the decision boundaries for the two classifiers are located such that they do not misclassify test instances from the class towards which they are biased. For all input test instances that are either below C+ or above C−, both biased classifiers provide identical class labels and thus a consensus, which may be determined by CA module 806, for example. On the other hand, there is no consensus for test instances that are between C+ and C−. Test instances in this region are thus passed on as next-stage inputs $I_{i+1}$ and provided to the next-stage classifier.

Figure 9:
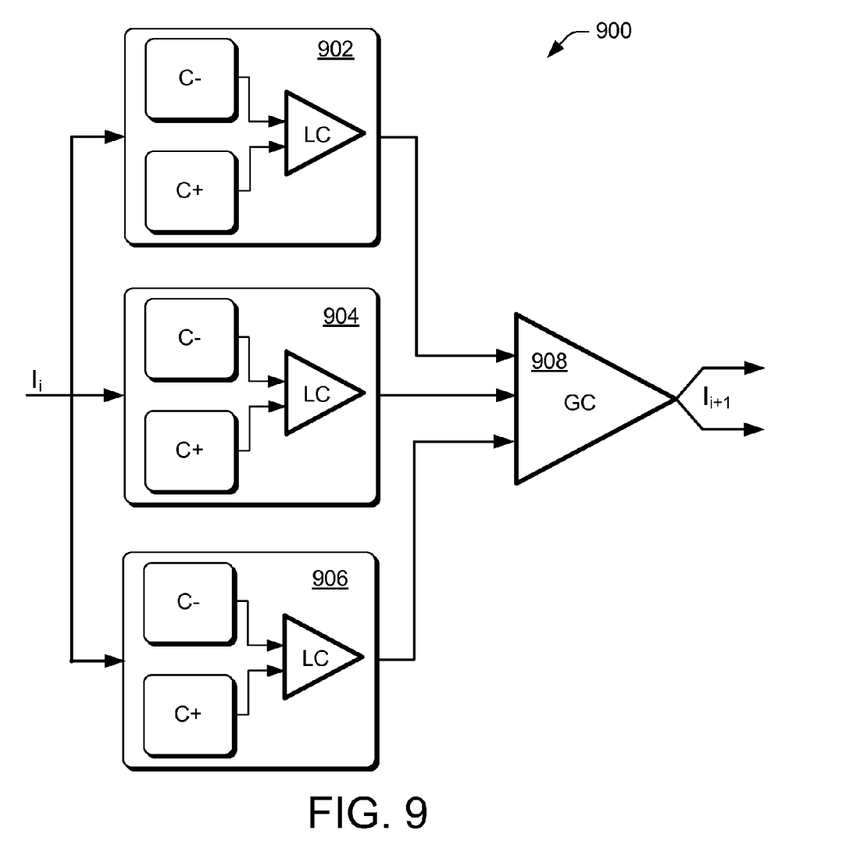
FIG. 9 is a block diagram of a multi-class scalable-effort classifier stage of a machine learning model, according to various example embodiments.

FIG. 9 is a block diagram of a multi-class SE classifier stage 900 of a machine learning model, according to various example embodiments. For example, SE classifier stage 900 may be the same as or similar to any of machine learning model stages 602-606, illustrated in FIG. 6. SE classifier stage 900 and SE classifier stage 800 share some common features, but SE classifier stage 900 is configured to operate with multi-class problems, whereas SE classifier stage 800 is configured to operate with binary-class problems. SE classifier stage 900 may be the ith stage of a multi-class machine learning model. For example, referring to FIG. 6, if SE classifier stage 900 is the ith stage (e.g., stage 1) of machine learning model 600, then stage 2 of machine learning model 600 is the (i+1)th stage. Test instance input $I_i$ for the ith stage may produce output $I_{i+1}$ for the (i+1)th stage, and so on.

In some embodiments, a binary-class classifier stage may be expanded to a multi-class classifier stage by using a one-versus-rest classification strategy, which reduces multi-class computations to multiple binary-class classifications. The strategy may involve training one classifier per class, with data samples from the class regarded as positive (+) while data samples outside the class are regarded as negative (−). At test time, the highest confidence values across multiple one-versus-rest classifiers may determine the final class assignment.

Accordingly, multi-class SE classifier stage 900 may include a number of binary-class classifiers 902-906 in parallel. Each binary-class classifier 902-906 comprises two biased classifiers, which are biased for and against a particular class, and a local consensus module LC, which determines the confidence level of a class label produced by the binary-class classifiers. In particular, each binary-class classifier 902-906 includes a + biased classifier "C+" and a − biased classifier "C−", both of which may individually operate on test instance input $I_i$.

In addition, SE classifier stage 900 may include a global consensus (GC) module 908, which aggregates outputs from all LC modules of the binary-class classifiers 902-906. GC module 908 may have a particular functionality such that if there is positive consensus (e.g., ++) in exactly one LC module, then GC module 908 outputs a class label corresponding to the consenting binary-classification unit (e.g., one of binary-class classifiers 902-906). On the other hand, if more than one LC module provides consensus, then the next SE classifier stage is invoked.

Figure 10:
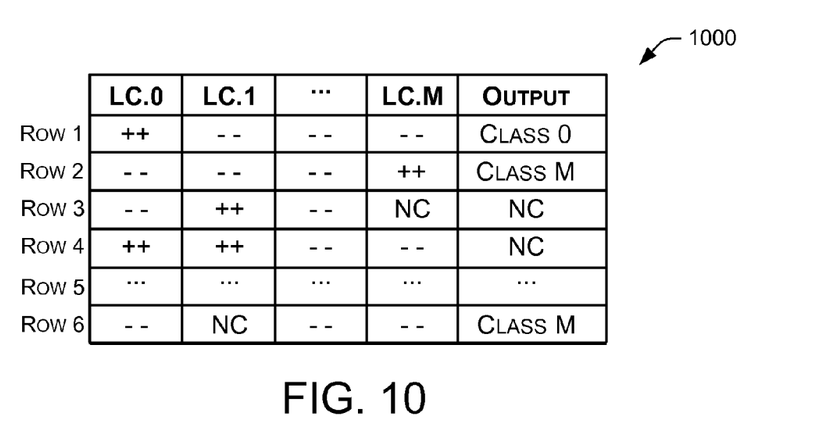
FIG. 10 is a table of consensus values generated by a global consensus module of a multi-class scalable-effort classifier stage of a machine learning model, according to various example embodiments.

FIG. 10 is a table 1000 of consensus values generated by a GC module, such as 908 for example, of a multi-class SE classifier stage, according to various example embodiments. Referring to FIG. 9, LC.0 may correspond to LC module of class 0 binary-class classifier 902, LC.1 may correspond to LC module of class 1 binary-class classifier 904, and LC.M may correspond to class M LC module of binary-class classifier 906, for example. In a first example case, referring to row 1 of table 1000, the LC module of class 0 binary-class classifier 902 detects a consensus between C+ and C− biased classifiers, where both biased classifiers determine that a test instance is class 0. The LC module of class 1 binary-class classifier 904 detects a consensus between C+ and C− biased classifiers, where both biased classifiers determine that a test instance is not class 1. Moreover, remaining binary-class classifiers, including 906, detect a consensus between C+ and C− biased classifiers, where both biased classifiers of each binary-class classifier determine that a test instance is not the class of the respective classifier. Accordingly, GC module 908 may output a class 0 label for the test instance.

In a second example case, referring to row 2 of table 1000, the LC module of class 0 binary-class classifier 902 detects a consensus between C+ and C− biased classifiers, where both biased classifiers determine that a test instance is not class 0. The LC module of class 1 binary-class classifier 904 detects a consensus between C+ and C− biased classifiers, where both biased classifiers determine that a test instance is not class 1. Moreover, remaining binary-class classifiers, except for 906, detect a consensus between C+ and C− biased classifiers, where both biased classifiers of each binary-class classifier determine that a test instance is not the class of the respective classifier. However, the LC module of class M binary-class classifier 904 detects a consensus between C+ and C− biased classifiers, where both biased classifiers determine that a test instance is class M. Accordingly, GC module 908 may output a class M label for the test instance.

In a third example case, referring to row 3 of table 1000, the LC module of class 0 binary-class classifier 902 detects a consensus between C+ and C− biased classifiers, where both biased classifiers determine that a test instance is not class 0. The LC module of class 1 binary-class classifier 904 detects a consensus between C+ and C− biased classifiers, where both biased classifiers determine that a test instance is class 1. Class M binary-class classifier 906 detects a non-consensus (NC) between C+ and C− biased classifiers. Accordingly, GC module 908 may forward the test instance to a subsequent SE classifier stage.

In some embodiments, multi-way SE classifiers are able to "class prune", where some classes may be eliminated from consideration during the process of labelling test instances. For example, if a classifier stage does not classify a given test instance, the classifier stage may eliminate some of the classes from consideration in the next classifier stage. Specifically, if there is no consensus in the GC module of a classifier stage and if the LC outputs show negative consensus (e.g., −−), then binary classification units corresponding to that particular class will be evaluated in subsequent classifier stages. Thus, only classes that produce positive consensus or non-consensus are retained down the sequence of classifier stages. Early class pruning may lead to increased computational efficiency.

As discussed above, identical labels from two biased classifiers of a stage imply consensus whereas contradicting labels imply non-consensus (NC). However, the biased classifiers may produce labels based, at least in part, on class probabilities associated with the labels. This provides an opportunity to design a slightly different consensus measure (or confidence value) called the "consensus threshold", which may, at least partially, control the number of test instances processed by a stage. Furthermore, the computing cost associated with a stage may be modulated depending, at least in part, on the method used for biasing the classifiers.

Figure 11:
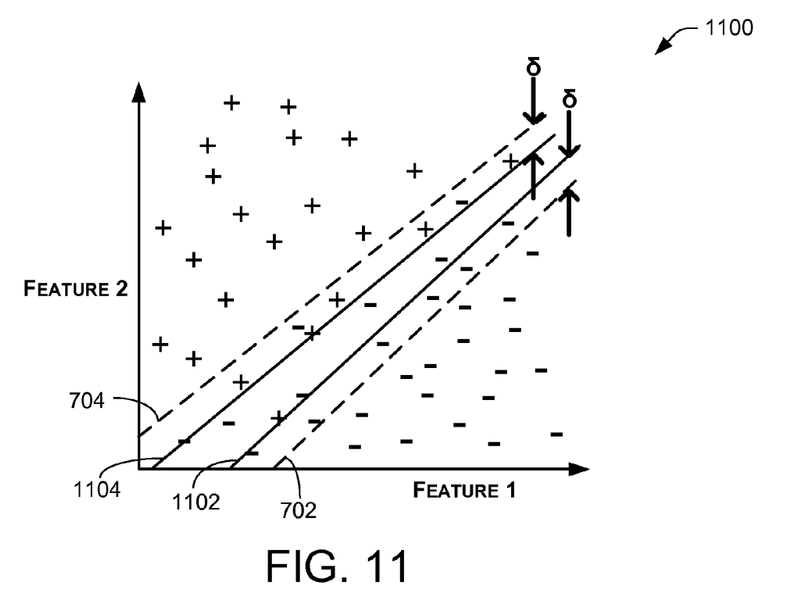
FIGS. 11-12 show features plotted in a feature space that includes biased component classifiers, according to various example embodiments.
Figure 12:
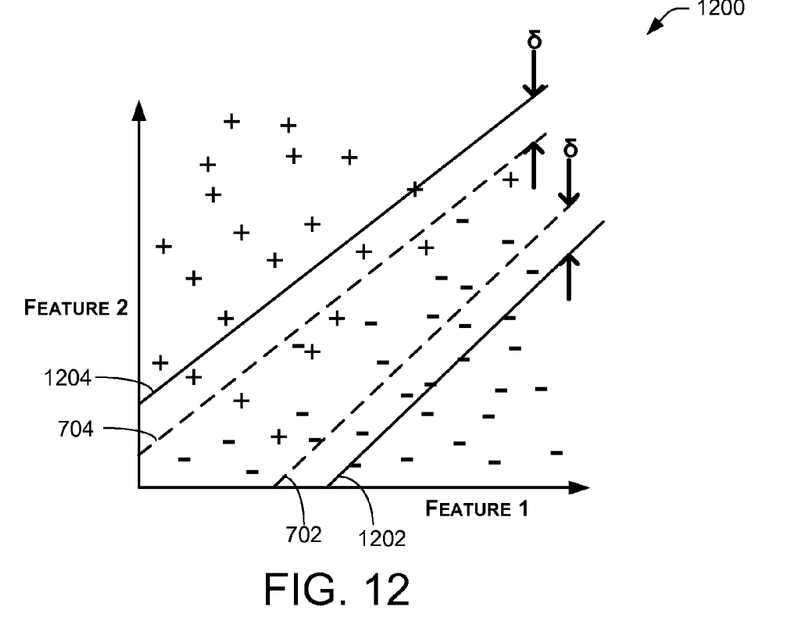

FIGS. 11 and 12 illustrate a number of features plotted in feature spaces 1100 and 1200, respectively, and biased classifiers adjusted by consensus thresholds, according to various example embodiments. Feature spaces 700 (FIG. 7), 1100, and 1200 are the same as one another, except for the following differences. Classifiers 702 and 704 are modified in feature spaces 1100 and 1200 to adjust outcomes of consensus operations performed by SE classifier stages. In particular, component classifier outputs may be combined over a continuum to either relax or tighten the consensus operations by using a consensus threshold, denoted by δ. In feature space 700, δ=0 and classifiers 702 and 704 not modified. In feature space 1100, δ<0 and classifiers 702 and 704 (shown as dashed lines) are modified by δ to be classifiers 1102 and 1104. In feature space 1200, δ>0 and classifiers 702 and 704 (shown as dashed lines) are modified by δ to be classifiers 1202 and 1204. Particular consensus threshold values may be selected for different SE classifier stages. Relatively large consensus threshold values for a classifier stage generally result in reducing the fraction of the input test instances that will be classified by the stage. On the other hand, relatively small consensus threshold values for a classifier stage generally result in increasing the fraction of the input test instances that will be classified by the stage.

Negative consensus threshold values for a classifier stage may lead to input test instances being labeled by the stage even if the biased classifiers of the stage disagree on the individual class assignments. This may occur, for example, if confidence values (e.g., in the contradictory predictions) of each of the biased classifiers is jointly greater than the consensus threshold. In this fashion, the consensus threshold may directly control the fraction of inputs classified by a stage. To achieve computational efficiency, the consensus threshold value may be optimized during training time such that the consensus threshold value minimizes the total number of misclassifications.

The consensus threshold provides a technique for biasing classifiers of an SE classifier stage. In this fashion, the consensus threshold may control the number of test instances processed by the classifier stage. In some embodiments, the technique used for biasing component classifiers may affect computational cost. For example, the total cost of each classifier stage may be the sum of the costs associated with the two biased classifiers of the stage. Any of a number of approaches may be used to configure and bias the classifiers of a stage. For example, asymmetric weighting is one such approach. Classifiers may be biased by assigning misclassification penalties to training instances. Such penalties may depend, at least in part, on the associated class labels. For example, while building a C+ classifier (e.g., 702, illustrated in FIG. 7), greater weights may be assigned to test instances from the + class, which encourages the test instances to be classified correctly at the cost of misclassifying test instances from the − class.

Resampling and sub-sampling may be another approach for configuring and biasing the classifiers of a stage. For example, to bias a classifier toward a particular class, additional test instances in the particular class may be generated by adding some uniform noise to the existing test instances or sub-sampling instances from the opposite class. This approach may provide a way of implicitly weighting the instances.

The consensus operation and method of biasing component classifiers in each stage of an SE classifier (e.g., SE classifier 600, illustrated in FIG. 6) may directly control the number of stages in the SE classifier and the fraction of training data processed by each stage. Because an SE classifier comprises many such individual stages in a sequence, the number of connected stages and the fraction of training data that is processed by each stage may determine, at least in part, the overall computing cost, runtime, and accuracy of the SE classifier. For example, for every stage i, with cost $\gamma_i$ per test instance, $I_i$ is the fraction of test instances that reach that stage (e.g., from a previous stage, unless the stage is the first in the series). If $\gamma_{i+1}$ is the cost per test instance of the next stage, then the following condition should be satisfied to admit stage i into the sequence:

$$\gamma_i \cdot (I_i - I_{i+1}) + \gamma_{i+1} \cdot I_{i+1} < \gamma_{i+1} \cdot I_i \quad (1)$$

The left-hand side of equation (1) represents the computing cost if the stage is present, which is given by the sum of the costs incurred due to the fraction of inputs that the stage classifies (e.g., $I_i - I_{i+1}$) and the costs incurred by the next stage due to the fraction of inputs that the stage does not classify (e.g., $I_{i+1}$). Preferably, this cost should be lower than the cost that would be incurred if all $I_i$ test instances were processed by the next stage (e.g., the right-hand side of Eq. (1) represents the latter cost).

Figure 13:
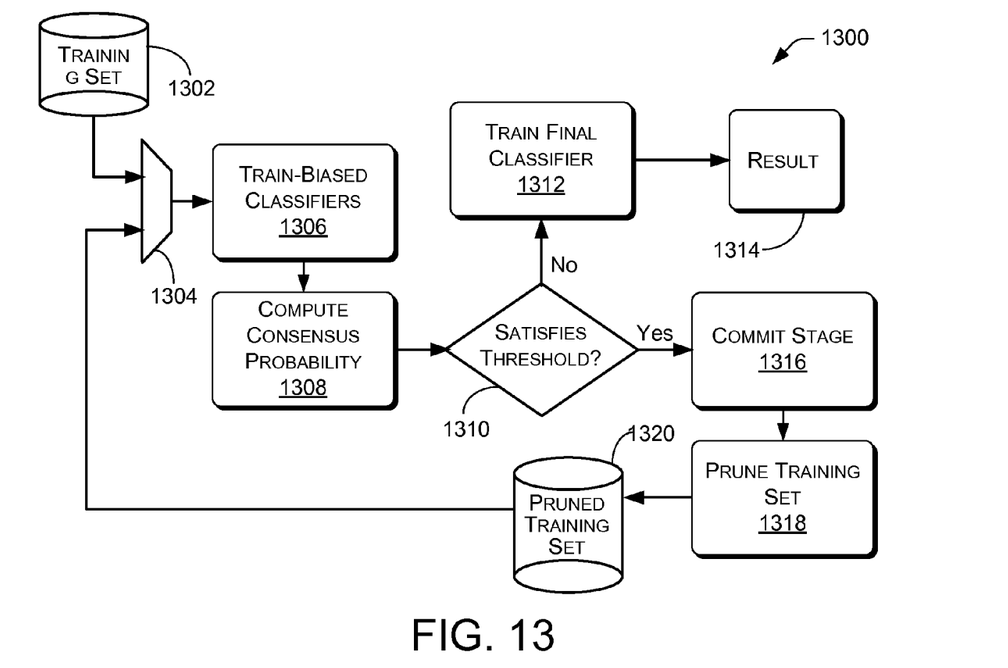
FIG. 13 is a block diagram of a training process for a scalable-effort classifier of a machine learning model, according to various example embodiments.

FIG. 13 is a block diagram of a training process for an SE classifier of a machine learning model, according to various example embodiments. A set of training instances 1302 may be provided, via a combiner 1304, to a machine learning operation that generates classifiers 1306 that are biased based, at least in part, on the training instances. Train-biased classifiers 1306 may be subsequently used to compute consensus probability 1308. The consensus probability determines the confidence of the biased classifier stage while operating on the various training instances. If the consensus probability of the biased classifier stage leads to the filtering of training instances such that the cost condition [Eq. (1) above] is satisfied at 1310, the classifier stage is admitted to the cascade chain, 1316. If not, the biased classifier stage is rejected and the final classifier is trained using all the remaining training data. This final stage is unbiased. In case the current biased classifier stage is admitted, (e.g., at 1316), the training set is pruned to eliminate all the instances that are classified correctly by the current biased classifier stage. This pruned training set is used through the combinatory block 1304 in all subsequent iterations of the algorithm. This process is self-terminating since at some point the cost threshold at 1310 is not satisfied by the biased classifier stage and the final unbiased classifier stage will be invoked.

In some embodiments, the following algorithm includes example pseudocode for a training process.

```
Input: Original classifier Corig, training dataset Dtr, # classes M
Output: Scalable-effort classifier Cse (incl. δ and C+/− ∀ stages)
 1: Train Corig using Dtr and obtain classifier cost γorig
 2: initialize stage gain Gstg = +∞, complexity param. λstg = −∞,
    and allClassesPresent = true
 3: while (Gstg > E and allClassesPresent) do
 4:   for currentClass :=1 to M do      // evaluate stage Cstg
 5:     Train C+/− biased towards currentClass using Dtr and λstg
 6:     δstg ← minimum δ s.t. training accuracy = 100%
 7:   end for
 8:   initialize # input instances to stage Istg = # instances in Dtr
      and # instances classified by stage ΔIstg = 0
 9:   for each trainInstance ∈ Dtr do   // compute ΔIstg for Cstg
10:     Compute local consensus LC ∀ M classes
11:     Compute global consensus GC
12:     if GC ← true then
13:       remove trainInstance from ∈ Dtr and ΔIstg ← ΔIstg + 1
14:     else
15:       ΔIstg ← ΔIstg + # negative LCs / M
16:     end if
17:   end for
18:   Gstg = (γorig − γstg ) · ΔIstg − γstg · (Istg − ΔIstg )
19:   if Gstg > E then admit stage Cstg into Cse
20:   if any class is absent in Dtr then allClassesPresent ← false
21:   λstg ++      // increase classifier complexity for next stage
22: end while
23: append Corig as the final stage of Cse
```

The algorithm uses the original classification algorithm Corig, training data Dtr, and number of classes M as input. The algorithm produces an SE version of the classifier Cse as output, which includes the biased classifiers C+/− and consensus thresholds δ for each stage. First, the algorithm includes training Corig on Dtr to obtain γorig, which is the cost of Corig (line 1). Then, the algorithm includes iteratively training each stage of the SE classifier Cstg (lines 2-22). The algorithm terminates if a stage does not improve the overall gain Gstg beyond a certain threshold E (line 3). Next, the algorithm includes steps involved in designing each stage of Cse. To compute Cstg, the algorithm initializes Gstg and complexity parameter λstg to +∞ and −∞, respectively (line 2). Then, the algorithm obtains C+/− (line 5). The algorithm assigns the smallest value of δ that yields an accuracy of about 100% on Dtr to be the consensus threshold for the stage δstg (line 6). Once C+/− and δstg are determined for all classes, the algorithm proceeds to estimate the number of inputs classified by the stage ΔIstg by iterating over Dtr (line 9-17). During this time, the algorithm computes local consensus (LC) and global consensus (GC) values for each instance in Dtr (lines 10-11). For any instance, if global consensus is achieved (line 12), the algorithm removes it from Dtr for subsequent stages and increments ΔIstg by one (line 13). If not, the algorithm adds a fractional value to ΔIstg, which is proportional to the number of classes eliminated from consideration by the stage (line 15). After all instances in Dtr are exhausted, the algorithm computes Gstg as the difference between the improvement in efficiency for the inputs it classifies and the penalty it imposes on inputs that it passes on to the next stage (line 18). The algorithm admits the stage Cstg to the SE classifier chain Cse only if Gstg exceeds E (line 19). Since instances that are classified by the stage are removed from Dtr used for subsequent stages, one or more classes may be exhausted. In this case, the algorithm terminates the construction of additional stages (line 20) and proceeds to append the final stage (line 23). The complexity of the classifier is increased for subsequent stages (line 21).

In some embodiments, the following algorithm includes example pseudocode for a testing process.

```
Input: Test instance itest, scalable-effort classifier Cse, # stages Nse
   in Cse, and # possible classes M
Output: Class label Ltest
 1: initialize possibleClassesList = {1,2,. . .,M}, currentStage = 1,
    and instanceClassified = false
 2: while instanceClassified = false do
 3:   if currentStage = Nse then        // apply Cse to itest
 4:     Ltest ← Cse [itest ]; instanceClassified ← true
 5:   else
 6:     Compute local consensus LC ∀ M classes
 7:     Compute global consensus GC
 8:     if GC ← true then          // global consensus achieved
 9:       Ltest ← label ∈ max (LC); instanceClassified ← true
10:     else
11:       ∀ LC = −1, delete labels from possibleClassesList
12:     end if
13:   end if
14:   currentStage ← currentStage + 1
15: end while
```

The algorithm obtains the class label Ltest using Cse. First, the algorithm initializes the list of possible outcomes in the set of all class labels (line 1). Each stage Cstg is invoked iteratively (lines 2-15) until the instance is classified (lines 2). In the worst case, Corig is employed in the final stage to produce a class label (lines 3-4). In all other cases, the algorithm performs the following steps. At each active stage, C+/− are invoked to obtain an estimate of LC (line 6) and GC (line 7). If (lines 8-10) global consensus is achieved (e.g., one LC output is positive and the rest are negative), then the instance is predicted to belong to the class with the highest LC value (line 9). If not, the list of active classes is pruned by removing the classes for which LC is negative (line 11). The algorithm then invokes subsequent stages with the reduced set of possible outcomes (line 14). Cse implicitly distinguishes between inputs that are easy and hard to classify. Thus, Cse improves the overall efficiency of any given data-driven classification algorithm.

Figure 14:
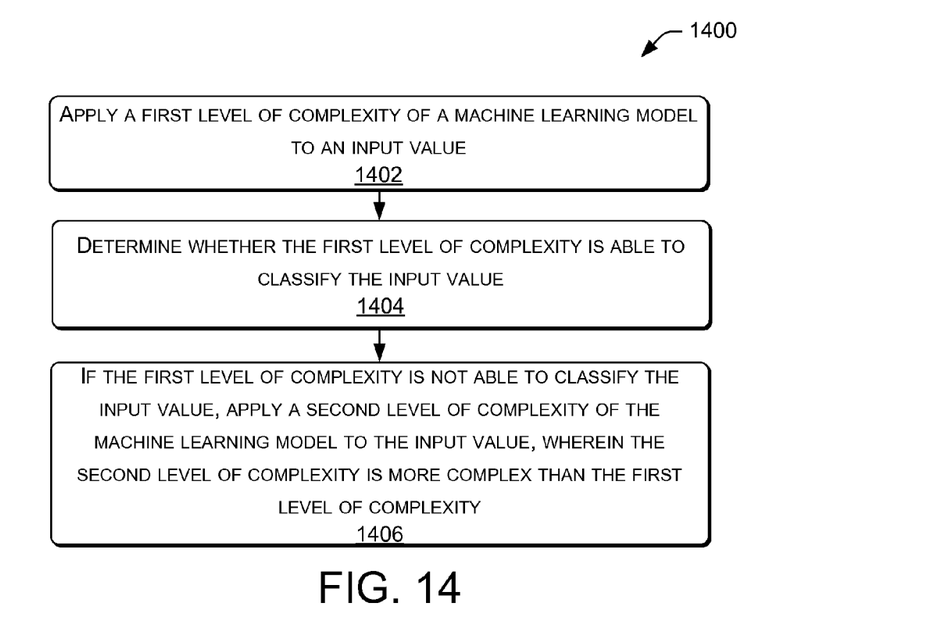
FIG. 14 is a flow diagram of a process performed by a machine learning model for classifying an input value, according to various example embodiments.

FIG. 14 is a flow diagram of a process 1400 performed by a machine learning model for classifying an input value, according to various example embodiments. For example, process 1400 may be performed by computing device 102, illustrated in FIG. 1. At block 1402, the machine learning model applies a first level of complexity to an input value, such as a data instance. At block 1404, the machine learning model determines whether the first level of complexity is able to classify the input value. For example, the input value may be classified with a label. In some implementations, the label may be one of two possibilities. At block 1406, if the first level of complexity is not able to classify the input value, the machine learning model may apply a second level of complexity of the machine learning model to the input value. The second level of complexity is more complex than the first level of complexity. Process 1400 may continue iteratively if, for example, the second level of complexity is not able to classify the input value. Then the machine learning model may apply a third level of complexity (more complex than the second level of complexity), and so on.

In some embodiments, methods described above are performed by a server in a network (e.g., the Internet or the cloud). The server performs normalization and aligns feature distributions of data collected by multiple client devices. The server, for example, receives, from a first client device, a first feature distribution generated by a first machine learning model hosted by the first client device, and receives, from a second client device, a second feature distribution generated by a second machine learning model hosted by the second client device. The server subsequently normalizes the first feature distribution with respect to the second feature distribution so that classification boundaries for each of the first feature distribution and the second feature distribution align with one another. The server then provides to the first client device a normalized first feature distribution resulting from normalizing the first feature distribution with respect to the second feature distribution. The first feature distribution is based, at least in part, on information collected locally by the first client device. The method can further comprise normalizing the first feature distribution with respect to a training distribution so that the classification boundaries for each of the first feature distribution and the training distribution align with one another.

The flows of operations illustrated in FIGS. 5, 7, and 11 are illustrated as collections of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor(s) to perform the recited operations. In the context of hardware, the blocks may represent one or more circuits (e.g., FPGAs, application specific integrated circuits—ASICs, etc.) configured to execute the recited operations.

Any routine descriptions, elements, or blocks in the flows of operations illustrated in FIGS. 5, 7, and 11 may represent modules, segments, or portions of code that include one or more executable instructions for implementing specific logical functions or elements in the routine.

Example A, a system comprising: one or more processors; and memory storing instructions that, when executed by the one or more processors, configure the one or more processors to perform operations comprising: receiving an input value; applying a first level of complexity of a machine learning model to the input value; determining whether the first level of complexity is able to classify the input value; and if the first level of complexity is not able to classify the input value, applying a second level of complexity of the machine learning model to the input value, wherein the second level of complexity is more complex than the first level of complexity.

Example B, the system as example A recites, wherein an amount of computing time used to classify the input value depends, at least in part, on the first level of complexity of the machine learning model.

Example C, the system as example A recites, the operations further comprising: if the first level of complexity is able to classify the input value, classifying the input value into one of two or more categories.

Example D, the system as example A recites, wherein applying the first level of complexity of the machine learning model to the input value comprises: applying a negatively biased first level of complexity to the input value to generate a first class label; and applying a positively biased first level of complexity to the input value to generate a second class label.

Example E, the system as example D recites, wherein determining whether the first level of complexity is able to classify the input value comprises: comparing the first class label to the second class label; and determining whether a consensus exists between the negatively biased first level of complexity and the positively biased first level of complexity based, at least in part, on the comparing.

Example F, the system as example D recites, the operations further comprising: adjusting the negatively biased first level of complexity and/or the positively biased first level of complexity to modify a likelihood that the first level of complexity is able to classify the input value.

Example G, the system as example A recites, wherein the input value is based, at least in part, on collected information from one or more of the following: capturing an image, capturing an audio sample, or receiving a search query.

Example H, a computing device comprising: an input port to receive an input value having a level of complexity; a memory device storing a plurality of machine learning models, wherein abilities of the machine learning models to classify the input value are different from one another; and a processor to apply one or more of the plurality of the machine learning models based, at least in part, on the level of complexity of the input value.

Example I, the computing device as example H recites, wherein the abilities of the machine learning models to classify the input value comprise: the abilities of the machine learning models to classify the input value into one of two or more categories.

Example J, the computing device as example H recites, wherein the processor is configured to: apply a negatively biased level of complexity to the input value to generate a first class label; and apply a positively biased level of complexity to the input value to generate a second class label.

Example K, the computing device as example J recites, wherein the processor is configured to: compare the first class label to the second class label; and determine whether a consensus exists between the negatively biased level of complexity and the positively biased level of complexity based, at least in part, on the comparing.

Example L, the computing device as example J recites, wherein the processor is configured to: adjust the negatively biased level of complexity and/or the positively biased level of complexity to modify a likelihood that the level of complexity is able to classify the input value.

Example M, the computing device as example H recites, wherein the processor is configured to apply the plurality of the machine learning models on the input value sequentially in order of increasing ability of the machine learning models to classify the input value.

Example N, the computing device as example H recites, wherein a computing cost of classifying the input value is proportional to the level of complexity of the input value.

Example O, computer-readable storage media of a client device storing computer-executable instructions that, when executed by one or more processors of the client device, configure the one or more processors to perform operations comprising: receiving an input value; applying a first level of complexity of a machine learning model to the input value; determining whether the first level of complexity is able to classify the input value; and if the first level of complexity is not able to classify the input value, applying a second level of complexity of the machine learning model to the input value, wherein the second level of complexity is more complex than the first level of complexity.

Example P, the computer-readable storage medium as example O recites, the operations further comprising: if the first level of complexity is able to classify the input value, classifying the input value into one of two or more categories.

Example Q, the computer-readable storage medium as example O recites, wherein applying the first level of complexity of the machine learning model to the input value comprises: applying a negatively biased first level of complexity to the input value to generate a first class label; and applying a positively biased first level of complexity to the input value to generate a second class label.

Example R, the computer-readable storage medium as example Q recites, the operations further comprising: adjusting the negatively biased first level of complexity and/or the positively biased first level of complexity to modify a likelihood that the first level of complexity is able to classify the input value.

Example S, the computer-readable storage medium as example Q recites, wherein determining whether the first level of complexity is able to classify the input value comprises: comparing the first class label to the second class label; and determining whether a consensus exists between the negatively biased first level of complexity and the positively biased first level of complexity based, at least in part, on the comparing.

Example T, the computer-readable storage medium as example S recites, wherein determining whether the first level of complexity is able to classify the input value comprises: calculating a confidence value based, at least in part, on the comparing.

Although the techniques have been described in language specific to structural features and/or methodological acts, it is to be understood that the appended claims are not necessarily limited to the features or acts described. Rather, the features and acts are described as example implementations of such techniques.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "might" or "may," unless specifically stated otherwise, are used to indicate that certain embodiments include, while other embodiments do not include, the noted features, elements and/or steps. Thus, unless otherwise stated, such conditional language is not intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y or Z," unless specifically stated otherwise, is to be understood to present that an item, term, etc. may be either X, or Y, or Z, or a combination thereof.

Many variations and modifications may be made to the above-described embodiments, the elements of which are to be understood as being among other acceptable examples. All such modifications and variations are intended to be included herein within the scope of this disclosure.

What is claimed is:

1. A system comprising:
   one or more processors; and
   memory storing instructions that, when executed by the one or more processors, configure the one or more processors to perform operations comprising:
   receiving an input value;
   applying a first level of complexity of a machine learning model to the input value by applying at least one biased first level of complexity to the input value to generate at least one class label;
   determining whether the first level of complexity is able to classify the input value; and
   if the first level of complexity is not able to classify the input value, applying a second level of complexity of the machine learning model to the input value, wherein the second level of complexity is more complex than the first level of complexity.

2. The system of claim 1, wherein an amount of computing time used to classify the input value depends, at least in part, on the first level of complexity of the machine learning model.

3. The system of claim 1, the operations further comprising:
   if the first level of complexity is able to classify the input value, classifying the input value into one of two or more categories.

4. The system of claim 1, wherein applying the first level of complexity of the machine learning model to the input value by applying at least one biased first level of complexity to the input value to generate at least one class label comprises:
   applying a negatively biased first level of complexity to the input value to generate a first class label; and
   applying a positively biased first level of complexity to the input value to generate a second class label.

5. The system of claim 4, wherein determining whether the first level of complexity is able to classify the input value comprises:
   comparing the first class label to the second class label; and
   determining whether a consensus exists between the negatively biased first level of complexity and the positively biased first level of complexity based, at least in part, on the comparing.

6. The system of claim 4, the operations further comprising:
   adjusting the negatively biased first level of complexity and/or the positively biased first level of complexity to modify a likelihood that the first level of complexity is able to classify the input value with a predetermined confidence level.

7. The system of claim 1, wherein the input value is based, at least in part, on collected information from one or more of the following: capturing an image, capturing an audio sample, or receiving a search query.

8. A computing device comprising:
   an input port to receive an input value having a level of complexity;
   a memory device storing a plurality of machine learning models, wherein abilities of the machine learning models to classify the input value are different from one another; and
   a processor to apply one or more of the plurality of the machine learning models based, at least in part, on the level of complexity of the input value, wherein the processor is configured to apply at least one biased first level of complexity to the input value to generate at least one class label.

9. The computing device of claim 8, wherein the abilities of the machine learning models to classify the input value comprise:
the abilities of the machine learning models to classify the input value into one of two or more categories.

10. The computing device of claim 8, wherein the configuration of the processor to apply at least one biased first level of complexity to the input value to generate at least one class label includes the processor being configured to:
apply a negatively biased level of complexity to the input value to generate a first class label; and
apply a positively biased level of complexity to the input value to generate a second class label.

11. The computing device of claim 10, wherein the processor is configured to:
compare the first class label to the second class label; and
determine whether a consensus exists between the negatively biased level of complexity and the positively biased level of complexity based, at least in part, on the comparing.

12. The computing device of claim 10, wherein the processor is configured to:
adjust the negatively biased level of complexity and/or the positively biased level of complexity to modify a likelihood that the level of complexity is able to classify the input value.

13. The computing device of claim 8, wherein the processor is configured to apply the plurality of the machine learning models on the input value sequentially in order of increasing ability of the machine learning models to classify the input value.

14. The computing device of claim 8, wherein a computing cost of classifying the input value is proportional to the level of complexity of the input value.

15. One or more computer-readable storage media of a client device storing computer-executable instructions that, when executed by one or more processors of the client device, configure the one or more processors to perform operations comprising:
receiving an input value;
applying a first level of complexity of a machine learning model to the input value by applying at least one biased first level of complexity to the input value to generate at least one class label;
determining whether the first level of complexity is able to classify the input value; and
if the first level of complexity is not able to classify the input value, applying a second level of complexity of the machine learning model to the input value, wherein the second level of complexity is more complex than the first level of complexity.

16. The one or more computer-readable storage media of claim 15, the operations further comprising: if the first level of complexity is able to classify the input value, classifying the input value into one of two or more categories.

17. The one or more computer-readable storage media of claim 15, wherein applying the first level of complexity of the machine learning model to the input value by applying at least one biased first level of complexity to the input value to generate at least one class label comprises:
applying a negatively biased first level of complexity to the input value to generate a first class label; and
applying a positively biased first level of complexity to the input value to generate a second class label.

18. The one or more computer-readable storage media of claim 17, the operations further comprising:
adjusting the negatively biased first level of complexity and/or the positively biased first level of complexity to modify a likelihood that the first level of complexity is able to classify the input value.

19. The one or more computer-readable storage media of claim 17, wherein determining whether the first level of complexity is able to classify the input value comprises:
comparing the first class label to the second class label; and
determining whether a consensus exists between the negatively biased first level of complexity and the positively biased first level of complexity based, at least in part, on the comparing.

20. The one or more computer-readable storage media of claim 19, wherein determining whether the first level of complexity is able to classify the input value comprises:
calculating a confidence value based, at least in part, on the comparing.

* * * * *